(12) United States Patent
Park

(10) Patent No.: US 10,648,384 B2
(45) Date of Patent: May 12, 2020

(54) EXHAUST GAS PURIFICATION SYSTEM AND CONTROLLING METHOD THEREOF

(71) Applicants: Hyundai Motor Company, Seoul (KR); Kia Motors Corporation, Seoul (KR)

(72) Inventor: Jin Woo Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 52 days.

(21) Appl. No.: 15/836,050

(22) Filed: Dec. 8, 2017

(65) Prior Publication Data

US 2018/0163590 A1   Jun. 14, 2018

(30) Foreign Application Priority Data

Dec. 14, 2016 (KR) .................. 10-2016-0170814

(51) Int. Cl.
*F01N 3/20* (2006.01)
*F01N 3/08* (2006.01)
(Continued)

(52) U.S. Cl.
CPC ............. *F01N 3/208* (2013.01); *F01N 3/035* (2013.01); *F01N 3/0814* (2013.01);
(Continued)

(58) Field of Classification Search
CPC ...... F01N 11/002; F01N 13/009; F01N 3/035; F01N 3/0814; F01N 3/0821; F01N 3/0885; F01N 3/106; F01N 3/2066; F01N 3/208; F01N 3/2885; F01N 3/2892; F01N 9/00; F01N 2240/20; F01N 2570/04; F01N 2570/14; F01N 2610/02; F01N 2900/1402; F01N 2900/1602; F01N 2900/1621; F02M 26/06; Y02A 50/2325; Y02T 10/24; Y02T 10/47
See application file for complete search history.

(56) References Cited

U.S. PATENT DOCUMENTS

2007/0036694 A1* 2/2007 Nishioka ................ B01D 53/90
                                                    422/168
2011/0094206 A1* 4/2011 Liu ....................... F01N 3/2066
                                                    60/274

(Continued)

*Primary Examiner* — Brandon D Lee
(74) *Attorney, Agent, or Firm* — Morgan, Lewis & Bockius LLP

(57) ABSTRACT

A controlling method of exhaust gas purification system to which a lean combustion engine is applied and an LNT device, a DPF or an SDPF, and an SCR device are provided includes detecting vehicle information and determining whether the vehicle information satisfies nitrogen oxide desorption condition of the LNT device; desorbing the nitrogen oxide until the nitrogen oxide of the LNT reaches predetermined reference amount through engine rich combustion when vehicle information satisfies the nitrogen oxide desorption condition of the LNT device; injecting urea to purify the nitrogen oxide after a first period after ending of desorption of the nitrogen oxide of the LNT; desorbing sulfide of the LNT through the engine rich combustion; and injecting urea to purify the nitrogen oxide after a second period after ending of desorption of the sulfide rich combustion of the LNT.

5 Claims, 7 Drawing Sheets

(51) Int. Cl.

| | | |
|---|---|---|
| *F01N 13/00* | (2010.01) | |
| *F01N 3/28* | (2006.01) | |
| *F02M 26/06* | (2016.01) | |
| *F01N 3/035* | (2006.01) | |
| *F01N 11/00* | (2006.01) | |
| *F01N 9/00* | (2006.01) | |
| *F01N 3/10* | (2006.01) | |

(52) U.S. Cl.
CPC ......... *F01N 3/0821* (2013.01); *F01N 3/0885* (2013.01); *F01N 3/106* (2013.01); *F01N 3/2066* (2013.01); *F01N 3/2885* (2013.01); *F01N 3/2892* (2013.01); *F01N 9/00* (2013.01); *F01N 11/002* (2013.01); *F01N 13/009* (2014.06); *F02M 26/06* (2016.02); *F01N 2240/20* (2013.01); *F01N 2570/04* (2013.01); *F01N 2570/14* (2013.01); *F01N 2610/02* (2013.01); *F01N 2900/1402* (2013.01); *F01N 2900/1602* (2013.01); *F01N 2900/1621* (2013.01); *Y02A 50/2325* (2018.01); *Y02T 10/24* (2013.01); *Y02T 10/47* (2013.01)

(56) References Cited

U.S. PATENT DOCUMENTS

| | | | |
|---|---|---|---|
| 2013/0186064 A1* | 7/2013 | Mehta | F01N 3/0871 60/274 |
| 2015/0143798 A1* | 5/2015 | Lee | F02D 41/1446 60/274 |
| 2016/0319724 A1* | 11/2016 | Alano | F01N 3/2892 |
| 2017/0051654 A1* | 2/2017 | Gupta | F01N 3/035 |

* cited by examiner

EXHAUST GAS PURIFICATION SYSTEM AND CONTROLLING METHOD THEREOF

CROSS-REFERENCE(S) TO RELATED APPLICATIONS

The present application claims priority Korean Patent Application No. 10-2016-0170814 filed on Dec. 14, 2016, the entire contents of which are incorporated herein for all purposes by this reference.

BACKGROUND OF THE INVENTION

Field of the Invention

The present invention relates to an exhaust gas purification system and controlling method thereof. More particularly, the present invention relates to an exhaust gas purification system and controlling method thereof which prevent from excess urea injection by ammonia generated during controlling lean nitrogen oxide trap catalyst.

Description of Related Art

In general, to reduce carbon monoxide (CO), hydrocarbon (HC), particulate matter (PM), nitrogen oxide (NOx), etc. As a pollution material contained in an exhaust gas, an exhaust system of an engine includes an exhaust gas post-treatment device such as a diesel oxidation catalyst (DOC) device, a diesel particulate matter filter (DPF), a selective catalytic reduction (SCR) device, and a nitrogen oxide storage catalyst (Lean $NO_x$ Trap, LNT catalytic) device, etc.

A conventional exhaust system may include an engine, a lean nitrogen oxide trap catalyst, a urea injector, a composite catalyst device (SCR on DPF; SDPF), and a selective catalytic reduction device (SCR). To correspond to reinforced exhaust gas regulation, a LNT device and SCR have been applied simultaneously. To purify the LNT device, ammonia and thermal energy generated during rich combustion period of desorption of nitrogen oxide ($DeNO_x$) and desorption of sulfide ($DeSO_x$) are delivered to the SDPF or SCR. At the present time, a nitrogen oxide detector recognize the ammonia as nitrogen oxide wrongly to increase supply amount of urea abnormally, thus ammonia slip is generated at the SCR device.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust gas purification system and controlling method thereof, in a composite system of LNT/SDPF, which prevent excess urea injection by ammonia generated during controlling nitrogen oxide trap catalyst device for responding to EU6d/RDE exhaust gas regulation by complementing advantages and disadvantages of the nitrogen oxide trap catalyst and selective catalytic reduction.

An exhaust gas purification system according to an exemplary embodiment of the present invention includes a nitrogen oxide trap catalyst (lean $NO_x$ trap; LNT) device configured to absorb and store nitrogen oxide generated by a lean combustion of an engine, and reduce the nitrogen oxide into nitrogen by a reduction action to be exhausted; a urea injector disposed at a rear of the LNT device and configured to inject a urea aqueous solution inside an exhaust pipe; a mixer disposed in the downstream of the urea injector; a composite catalyst device (SCR on DPF; SDPF) disposed at the rear of the mixer and in which the selective catalytic reduction (SCR) is coated to a high pore diesel particulate matter filter; and a selective catalytic reduction (SCR) device disposed at the rear of the SDPF and configured to reduce the nitrogen oxide of the exhaust gas passing through the diesel particulate matter filter.

A low pressure exhaust gas recirculation (LP-EGR) device pipe may be connected between the SDPF and the SCR device.

Meanwhile, the exhaust gas purification system according to an exemplary embodiment of the present invention may further include an ammonia oxidation catalyst (AOC) device disposed at the rear of the SCR device, configured to oxidize ammonia of the exhaust gas passing through the SCR device and reduce the nitrogen oxide.

Meanwhile, the exhaust gas purification system according to an exemplary embodiment of the present invention may further include an injection chamber connecting the LNT device and the SDPF and forming a portion where the reduction agent is injected by the urea injector.

A nitrogen oxide detector may be disposed between the LNT device and the urea injector, and between the SDPF and the SCR device.

The LNT device, the urea injector, the mixer, and the SDPF may be disposed at an engine compartment of the vehicle, and the SCR device may be disposed at a lower portion of a vehicle.

Meanwhile, an exhaust gas purification system according to an exemplary embodiment of the present invention includes an LNT device configured to absorb and store a nitrogen oxide generated by a lean combustion of an engine and the reduce the nitrogen oxide into nitrogen by a reduction action to be exhausted; a diesel particulate matter filter (DPF) disposed at a rear of the LNT device and configured to reduce a particulate material of the exhaust gas; a urea injector disposed at a rear of the DPF and configured to inject a urea aqueous solution inside an exhaust pipe; a mixer disposed in the downstream of the urea injector; and an SCR device disposed at the rear of the mixer and configured to reduce the nitrogen oxide of the exhaust gas passing through the DPF.

An LP-EGR device pipe may be connected between the DPF and the urea injector.

A nitrogen oxide detector may be provided between the LNT device and the DPF, or at the rear end portion of the DPF, and at the end portion of the SCR device.

The LNT device and the DPF may be disposed at an engine compartment of the vehicle, and the urea injector, the mixer and the SCR device may be disposed at a lower portion of a vehicle.

Nitrogen oxide detectors may be disposed at the front and rear end portions of the SCR device.

Meanwhile, a controlling method of exhaust gas purification system to which a lean combustion engine is applied and an LNT device, a DPF or an SDPF, and an SCR device are provided includes detecting vehicle information and determining whether or not the vehicle information satisfies nitrogen oxide desorption condition of the LNT device; desorbing the nitrogen oxide until the nitrogen oxide of the LNT reaches predetermined reference amount through engine rich combustion when vehicle information satisfies the nitrogen oxide desorption condition of the LNT device;

injecting urea to purify the nitrogen oxide after a first period after ending of desorption of the nitrogen oxide of the LNT; desorbing sulfide of the LNT through the engine rich combustion; and injecting urea to purify the nitrogen oxide after a second period after ending of desorption of the sulfide rich combustion of the LNT.

The first period may be determined by an engine driving condition, the LNT temperature, the SDPF catalyst temperature, the engine temperature, the amount of nitrogen oxide at a rear end portion of the LNT device, the ammonia trap amount and relative trap rate of the SDPF, exhaust gas flow rate, and the internal temperature of the urea injector etc.

The engine driving condition may be engine rich combustion.

Nitrogen oxide desorption region of the LNT may be region that temperature of the SCR is 200 to 300° C.

The second period may be determined by engine driving condition, the LNT temperature, the SDPF catalyst temperature, the engine temperature, the amount of nitrogen oxide at a rear end portion of the LNT device, the ammonia trap amount and relative trap rate of the SDPF, exhaust gas flow rate, and the internal temperature of the urea injector etc.

The engine driving condition may be engine rich combustion.

Desorption of the sulfide region of the LNT is region that temperature of the SCR may be above 500° C.

According to an exemplary embodiment of the present invention, in the LNT/SDPF composite system, excess urea injection by ammonia generated during controlling lean nitrogen oxide trap catalyst may be prevented.

Also, abnormal increase of amount of urea supply is prevented to suppress ammonia slip from the SCR device and stable purification rate of nitrogen oxide may be obtained.

Also, refill cycle of urea in a urea tank may be increased.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
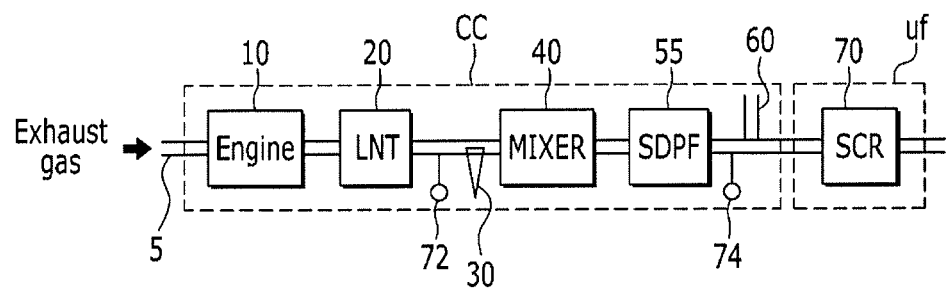
FIG. 1 is a schematic block diagram of an exhaust gas purification system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary invention(s) is intended to cover not only the exemplary embodiments, but also various alternatives, modifications, equivalents and other embodiments, which may be included within the spirit and scope of the invention as defined by the appended claims.

It will be understood that when an element including a layer, film, region, or substrate is referred to as being "on" another element, it can be directly on the other element or intervening elements may also be present.

Now, exhaust gas purification devices according to several exemplary embodiment of the present invention will be described with reference to FIG. 1, FIG. 2, FIG. 3, and FIG. 4.

FIG. 1 is a schematic block diagram of an exhaust gas purification system according to an exemplary embodiment of the present invention.

Referring to FIG. 1, the exhaust system is connected to an engine 10 to purify the exhaust gas of the engine 10 and includes a nitrogen oxide trap catalyst (lean $NO_x$ trap; LNT) device 20, a urea injector 30, a mixer 40, a composite catalyst device (SCR on DPF; SDPF) 55, and a selective catalytic reduction device (SCR) 70.

The LNT device 20 absorbs and stores the nitrogen oxide generated by a lean combustion of the engine 10 and reduces the nitrogen oxide into nitrogen by the reduction action to be exhausted. That is, the front of the LNT device 20 is connected to the engine 10 to receive the exhaust gas exhausted from the engine 10. Here, the front and the rear of the constituent element is based on the flow of the exhaust gas and it is defined that the exhaust gas flows from the front to the rear of the constituent elements.

The urea injector 30 is disposed at the rear of the LNT device 20 and injects the urea aqueous solution to the inside of an exhaust pipe 5. The urea injector 30 may inject the urea and may directly inject ammonia. Also, other reduction agents besides ammonia may be injected along with ammonia or the like.

The mixer 40 is disposed in the downstream of the urea injector 30 to enable the rapid flow diffusion of the exhaust gas passing through the LNT device 20.

The SDPF 55 may be disposed at the rear of the mixer 40 and in which the selective catalytic reduction (SCR) is coated to a high pore diesel particulate matter filter, the selective catalytic reduction may be degraded by the high temperature when being exposed to a high temperature.

The SCR device 70 is disposed at the rear of the SDPF 55. The SCR device 70 functions converting the reduction agent (the urea) into ammonia by the heat of the exhaust gas, and reducing the nitrogen oxide into a nitrogen gas and water as the catalyst reaction of the nitrogen oxide and the ammonia among the exhaust gas by the SCR.

A nitrogen oxide detector 72 and 74 may be provided between the LNT device 20 and the urea injector 30, and between the SDPF 55 and the SCR device 70, measuring the nitrogen oxide amount after the exhaust gas passes through the LNT device 20 and the SDPF 55.

Meanwhile, the low pressure exhaust gas recirculation device pipe 60 is connected between the SDPF 55 and the SCR device 70 wherein the exhaust gas passing through the SDPF 55 may be recycled to the engine 10 through the exhaust gas recirculation device. The exhaust gas recirculation device recycles the part of the exhaust gas exhausted after the combust of the fuel in the engine 10 to an intake device of the engine 10 to be again inflow to the combustion chamber of the engine 10. As a consequence, an air-fuel mixture decreases in density without a change in the air-fuel ratio of the air-fuel mixture, thus lowering the combustion temperature.

That is, the exhaust gas recirculation device supplies the part of the exhaust gas to the intake system of the engine 10 to inflow it to the combustion chamber when it is necessary to reduce the exhaust amount of the nitrogen oxide depending on the driving state of the engine 10. By doing so, exhaust gases, which are inert gases whose volume does not change, contribute to decrease the density of the mixture to a lower value, and therefore decrease the flame propagation velocity during fuel combustion. The present suppresses an increase in combustion temperature and slows the fuel combustion, suppressing the generation of nitrogen oxides.

Meanwhile, the LNT device 20, the urea injector 30, the mixer 40, and the SDPF 55 may be disposed at an engine compartment CC of the vehicle, and the SCR device 70 may be disposed at a vehicle lower portion uf.

By providing the urea injector 30 and the mixer 40 at the engine compartment CC, the urea injection is possible in a high temperature and the uniform mixing of the exhaust gas is possible. Also, since the urea is injected from the engine compartment CC and ammonia is supplied to the selective catalytic reduction device 70 of the vehicle lower portion uf, the flow uniformity of ammonia is high by the mixing of the exhaust gas, and the selective catalytic reduction device 70 of the further larger volume may be ensured at the vehicle lower portion uf.

Figure 2:
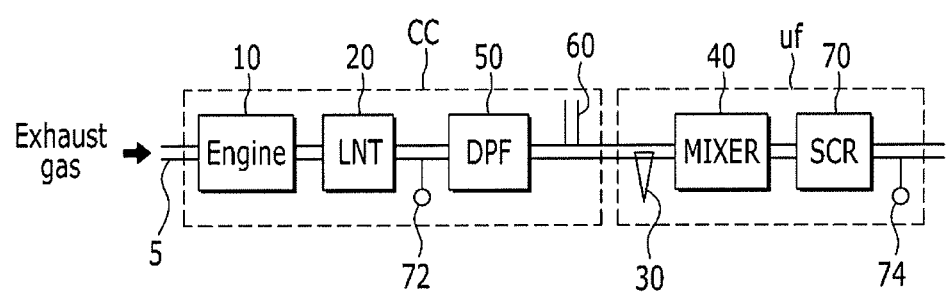
FIG. 2 is a schematic block diagram of an exhaust gas purification system according to another exemplary embodiment of the present invention.

FIG. 2 is a schematic block diagram of an exhaust gas purification system according to another exemplary embodiment of the present invention.

As shown in FIG. 2, in the exhaust system according to another exemplary embodiment of the present invention, differently from the exhaust system according to an exemplary embodiment of the present invention referring to FIG. 1, a diesel particulate matter filter 50 may be disposed instead of the SDPF 55.

The diesel particulate matter filter 50 is formed as the catalyst carrier to trap the particulate material included in the exhaust gas and the particulate material is purified through a chemical conversion process. That is, the diesel particulate matter filter 50 is a device physically trapping the particulate material among the exhaust gas of the diesel engine 10 by use of the filter and increasing the exhaust gas temperature of the particulate material above an ignition temperature 550° C. after driving by a predetermined distance to combust the particulate material, reducing a pollution material.

In the diesel particulate matter filter 50, a pressure detector or a temperature detector may be provided at the front and the rear, and the detectors detect the pressure and the temperature after and before the exhaust gas passes through the diesel particulate matter filter 50, an electronic control unit (ECU) may control the engine 10 and related devices to remove the particulate material.

The diesel particulate matter filter 50 may be coated with the catalyst with the noble metal (platinum (Pt), palladium (Pd)). Since the noble metal is not coated, ammonia of the exhaust gas inflowing to the diesel particulate matter filter 50 may be prevented from being oxidized.

The urea injector 30 injecting the urea aqueous solution inside the exhaust pipe 5 is provided at the rear of the diesel particulate matter filter 50, and the mixer 40 to enable the rapid flow diffusion of the exhaust gas passing through the diesel particulate matter filter 50 is provided in the downstream of the urea injector 30.

The selective catalytic reduction device 70 reducing the nitrogen oxide of the exhaust gas passing through the diesel particulate matter filter 50 is disposed at the rear of the mixer 40.

The diesel particulate matter filter 50 according to the present exemplary embodiment may be coated with the catalyst without the noble metal.

As shown in FIG. 2, a nitrogen oxide detector 72 and 74 may be provided between the LNT device 20 and the DPF 50, or at the rear end portion of the DPF 50, and at the end portion of the SCR device 70. Accordingly, the nitrogen oxide amount after the exhaust gas passes through the LNT device 20 and the SCR device 70 may be measured.

Further, the low pressure exhaust gas recirculation device pipe may be connected between the DPF 50 and the urea injector 30.

The LNT device 20 and the DPF 50 may be disposed at an engine compartment CC of the vehicle, and the urea injector 30, the mixer 40, and the SCR device 70 may be disposed at a vehicle lower portion uf.

Figure 3:
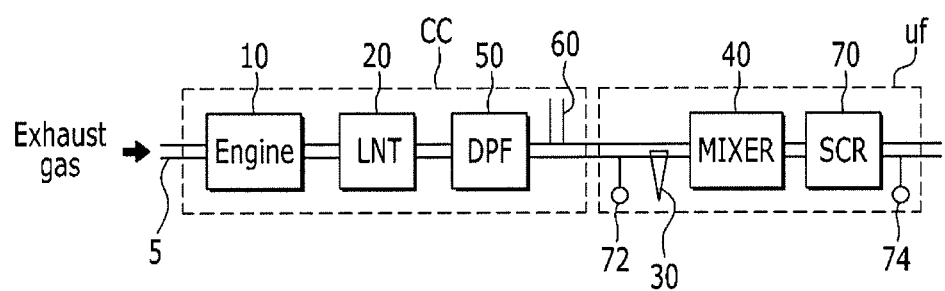
FIG. 3 is a schematic block diagram of an exhaust gas purification system according to another exemplary embodiment of the present invention.

FIG. 3 is a schematic block diagram of an exhaust gas purification system according to another exemplary embodiment of the present invention.

Referring to FIG. 3, the exhaust gas purification system is same with exemplary embodiment illustrated in FIG. 2 except location of the nitrogen oxide detectors 72 and 74. The exhaust gas purification system according to an exemplary embodiment illustrated in FIG. 3 has nitrogen oxide detectors 72 and 74 provided at the front and rear end portions of the SCR device 70, measures the nitrogen oxide amount before and after passing through the SCR device 70.

Figure 4:
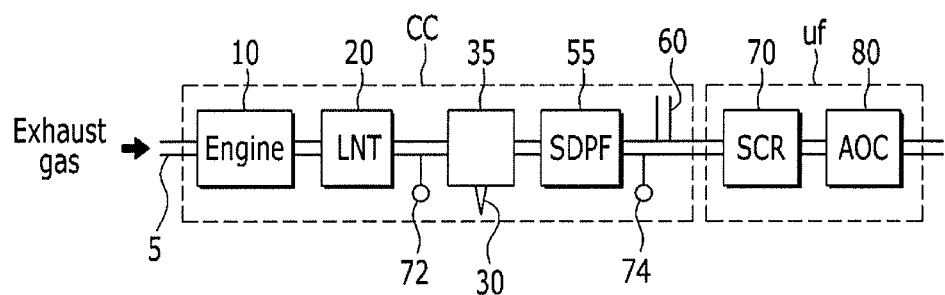
FIG. 4 is a schematic block diagram of an exhaust gas purification system according to another exemplary embodiment of the present invention.

FIG. 4 is a schematic block diagram of an exhaust gas purification system according to another exemplary embodiment of the present invention.

Referring to FIG. 4, the exhaust gas purification system is same with exemplary embodiment illustrated in FIG. 1 except the exhaust gas purification system further includes an injection chamber 35 and an ammonia oxidation catalyst (AOC) device 80.

As shown in FIG. 4, the exhaust gas purification system may further include an injection chamber 35 connecting the LNT device 20 and the SDPF 55, and forming the portion where the reduction agent is injected by the urea injector 30. The reduction agent injected inside the injection chamber 35 is uniformly mixed by the mixer 40 disposed in the injection chamber 35, and the exhaust gas and the reduction agent rapidly flow and are diffused to the SDPF 55 connected to the rear of the injection chamber 35.

Further, the ammonia oxidation catalyst device 80 is disposed at the rear of the SCR device 70 and may oxidize ammonia of the exhaust gas passing through the SCR device 70 and reduce the nitrogen oxide The ammonia oxidation catalyst device 80 functions preventing ammonia from being directly emitted into the atmosphere. The present case is to prevent an air pollution by an ammonia slip phenomenon that the reduction agent does not participate in the reaction and is directly exhausted into the atmosphere when the reduction agent is excessively injected to ensure the high selective catalytic reduction efficiency.

The ammonia oxidation catalyst may be a copper-contained zeolite impregnated with the noble metal, or an iron-contained zeolite impregnated with the noble metal, or a copper impregnated with the noble metal, an silicon containing alumina catalyst composition.

In the exemplary embodiment illustrated in FIG. 1 to FIG. 3, the injection chamber may be disposed where the urea injector is disposed, and the reduction agent injected inside the injection chamber 35 may be uniformly mixed by the mixer disposed in the injection chamber 35.

Likewise, in the exemplary embodiment illustrated in FIG. 1 to FIG. 3, the exhaust gas purification system may further include the ammonia oxidation catalyst device 80 disposed at the rear of the SCR device 70.

The LNT device 20, the urea injector 30, the mixer 40, the injection chamber 35, and the SDPF 55 may be disposed at an engine compartment CC of the vehicle, and the SCR device 70 and the ammonia oxidation catalyst device 80 may be disposed at a vehicle lower portion uf.

Figure 5:
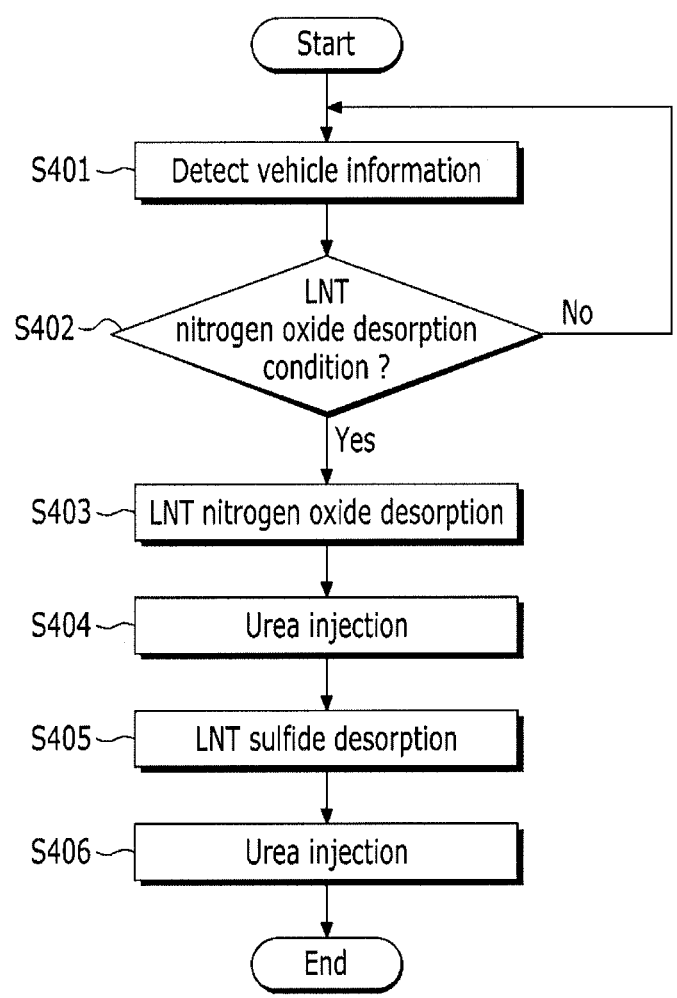
FIG. 5 is a flow chart illustrating a controlling method of an exhaust gas purification system according to an exemplary embodiment of the present invention.
Figure 6:
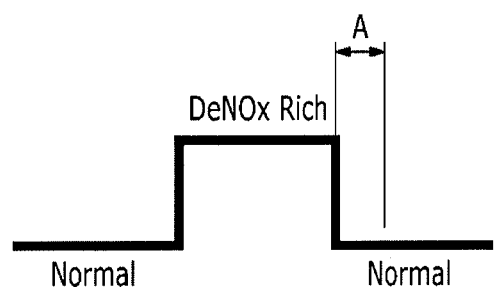
FIG. 6 is a drawing illustrating a first period during desorption of nitrogen oxide according to an exemplary embodiment of the present invention.
Figure 7:
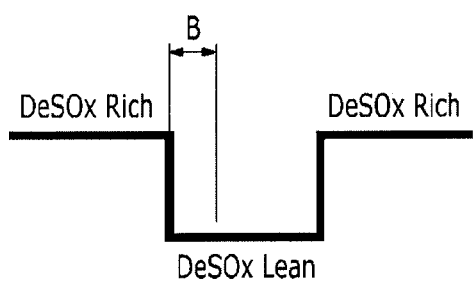
FIG. 7 is a drawing illustrating a second period during desorption of sulfide according to an exemplary embodiment of the present invention.

FIG. 5 is a flow chart illustrating a controlling method of an exhaust gas purification system according to an exemplary embodiment of the present invention, FIG. 6 is a drawing illustrating a first period during desorption of nitrogen oxide according to an exemplary embodiment of the present invention, and FIG. 7 is a drawing illustrating a second period during desorption of sulfide according to an exemplary embodiment of the present invention.

Referring to FIG. 5, various embodiments of the present invention relates to a controlling method of exhaust gas purification system to which a lean combustion engine is applied and an LNT device, a DPF or an SDPF, and an SCR device are provided. When the engine providing lean combustion and the vehicle applied to the present invention drives, the controller detects vehicle information and determines whether or not the vehicle information satisfies nitrogen oxide desorption condition of the LNT device S401 and S402.

Then, the nitrogen oxide is desorbed until the nitrogen oxide of the LNT reaches predetermined reference amount through engine rich combustion when vehicle information satisfies the nitrogen oxide desorption condition of the LNT device S403.

The controller controls the rise of temperature of the exhaust gas by applying at least one of control of fuel amount injected to the engine, adjustment of intake air amount, or control of fuel injection at the rear end portion of exhaust manifold.

Then, urea is injected to purify the nitrogen oxide after a first period A after ending of desorption of the nitrogen oxide of the LNT S404. The urea injection stops for a certain period (the first period A) after ending of desorption of the nitrogen oxide. The urea injection stop may be implemented by stopping urea injection control system for the first period A or substituting measured value of the nitrogen oxide detector for the first period A to 0 ppm to make the required urea amount to be zero.

The first period A may be determined by an engine driving condition, the LNT temperature, the SDPF catalyst temperature, the engine temperature, the amount of nitrogen oxide at a rear end portion of the LNT device, the ammonia trap amount and relative trap rate of the SDPF, exhaust gas flow rate, and the internal temperature of the urea injector etc.

As shown in FIG. 6, the engine driving condition during the nitrogen oxide desorption is engine rich combustion, and the urea injection stops for the first period A after ending of desorption of the nitrogen oxide and being normal density. Nitrogen oxide desorption region of the LNT may be region that temperature of the SCR is approximately 200 to approximately 300° C., and a portion of ammonia generated from the LNT device may be absorbed or the nitrogen oxide may be purified.

Then, desorbing sulfide is provided to the LNT through the engine rich combustion S405. At the present time, desorbing sulfide region of the LNT is the region that the temperature of the SCR is above approximately 500° C., and it is difficult to absorb ammonia generated from the LNT device or purify the nitrogen oxide since absorption capacity of ammonia is much reduced.

Then, urea is injected to purify the nitrogen oxide after a second period B after ending of desorption of the sulfide rich combustion of the LNT S406. The urea injection stops for a certain period (the second period B) after ending of desorption of the sulfide. The urea injection stop may be implemented by stopping urea injection control system for the second period B or substituting the measured value of the nitrogen oxide detector for the second period B to 0 ppm to make the required urea amount to be zero. Also, the urea may be injected for short by substituting only a certain factor of measurement value of the nitrogen oxide detector for the second period B to density of the nitrogen oxide.

The second period B may be determined by the engine driving condition, the LNT temperature, the SDPF catalyst temperature, the engine temperature, the amount of nitrogen oxide at a rear end portion of the LNT device, the ammonia trap amount and relative trap rate of the SDPF, exhaust gas flow rate, and the internal temperature of the urea injector etc.

As shown in FIG. 7, the engine driving condition during the desorption of the sulfide is engine rich combustion, and the urea injection stops for the second period B after ending of desorption of the sulfide and being lean density.

As described above, the exhaust gas purification system and controlling method thereof prevent from excess urea injection by ammonia generated during controlling lean nitrogen oxide trap catalyst.

Also, abnormal increase of the amount of urea supply is prevented to suppress ammonia slip from the SCR device and stable purification rate of nitrogen oxide may be obtained.

Also, refill cycle of urea in a urea tank may be increased.

For convenience in explanation and accurate definition in the appended claims, the terms "upper", "lower", "internal" and "outer", "up," "down," "upper", "lower," "upwards," "downwards", "front", "rear", "back", "inside", "outside", "inwardly," "outwardly," "internal", "external", "internal," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A controlling method of an exhaust gas purification system to which a lean combustion engine is applied and a lean $NO_x$ trap (LNT) device, a diesel particulate matter filter (DPF) or an SDPF, and an SCR device are provided, the method comprising:
   detecting vehicle information and determining whether the vehicle information satisfies nitrogen oxide desorption condition of the LNT device;
   desorbing nitrogen oxide until the nitrogen oxide of the LNT reaches a predetermined reference amount through an engine rich combustion when the vehicle information satisfies the nitrogen oxide desorption condition of the LNT device;
   injecting urea to purify the nitrogen oxide after a first period after desorption of the nitrogen oxide of the LNT disposed upstream of the DPF or the SDPF is ended when the nitrogen oxide of the LNT reaches the predetermined reference amount;
   desorbing sulfide of the LNT through the engine rich combustion; and
   injecting urea to purify the nitrogen oxide after a second period after ending of desorption of the sulfide rich combustion of the LNT,
   wherein the first period is configured to be determined by engine driving condition, LNT temperature, SDPF catalyst temperature, engine temperature, amount of nitrogen oxide at a rear end portion of the LNT device, ammonia trap amount and relative trap rate of the SDPF, exhaust gas flow rate, and internal temperature of a urea injector,
   wherein the second period is configured to be determined by engine driving condition, LNT temperature, SDPF catalyst temperature, engine temperature, amount of nitrogen oxide at a rear end portion of the LNT device, ammonia trap amount and relative trap rate of the SDPF, exhaust gas flow rate, and internal temperature of a urea injector, and
   wherein the first period and second period are urea injection stop periods, so that abnormal increase of amount of urea supply is prevented to suppress ammonia slip from the SCR device by the urea injection stops.

2. The controlling method of the exhaust gas purification system of claim 1, wherein the engine driving condition is the engine rich combustion.

3. The controlling method of the exhaust gas purification system of claim 2, wherein nitrogen oxide desorption region of the LNT is region that temperature of the SCR is 200 to 300° C.

4. The controlling method of the exhaust gas purification system of claim 1, wherein
   the engine driving condition is the engine rich combustion.

5. The controlling method of the exhaust gas purification system of claim 4, wherein
   desorption of sulfide region of the LNT is region that temperature of the SCR is above 500° C.

* * * * *